April 27, 1954  N. O. CLARK  2,677,039
SOLDERING DEVICE AND ITS OPERATING SYSTEM
Filed May 15, 1952  3 Sheets-Sheet 1
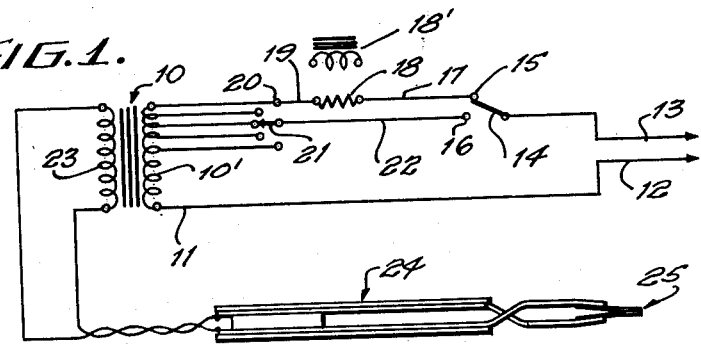
FIG.1.
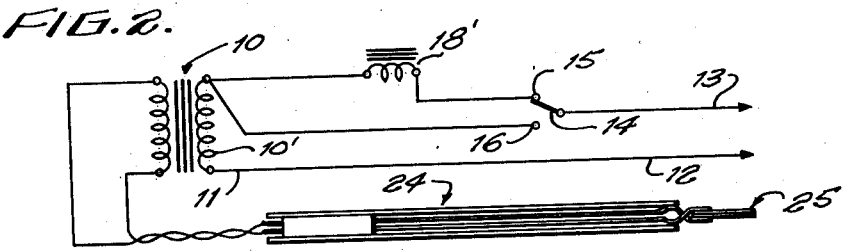
FIG.2.
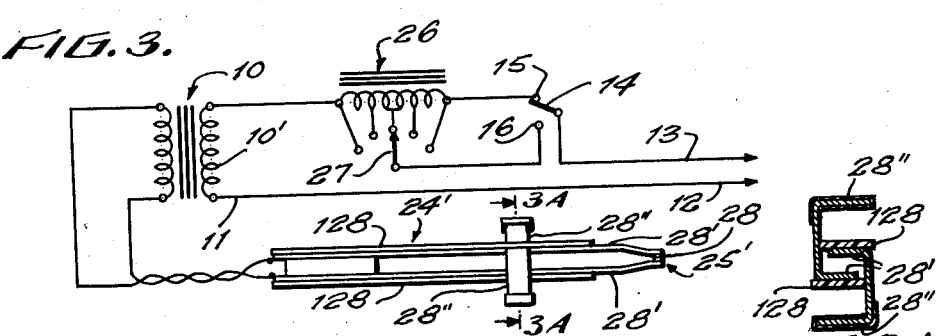
FIG.3.
FIG.3A.
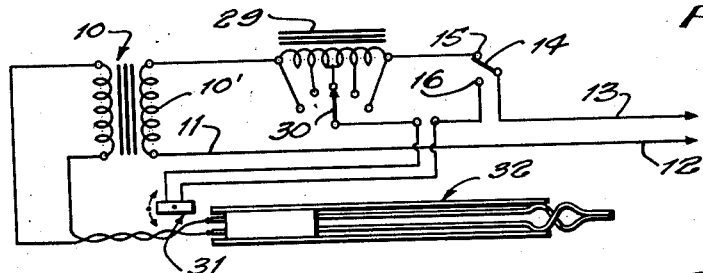
FIG.4.
INVENTOR.
NELSON O. CLARK
BY
ATTORNEY April 27, 1954     N. O. CLARK     2,677,039
SOLDERING DEVICE AND ITS OPERATING SYSTEM
Filed May 15, 1952     3 Sheets-Sheet 2

INVENTOR.
NELSON O. CLARK
BY
ATTORNEY

April 27, 1954  N. O. CLARK  2,677,039
SOLDERING DEVICE AND ITS OPERATING SYSTEM
Filed May 15, 1952  3 Sheets-Sheet 3
FIG.12.
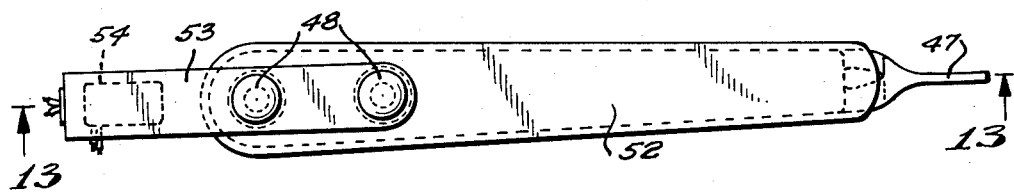
FIG.13.
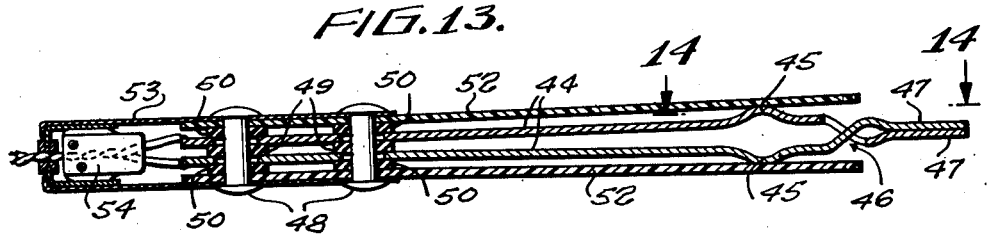
FIG.15.
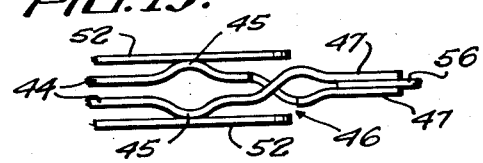
FIG.14.
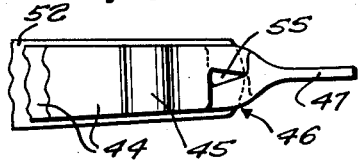
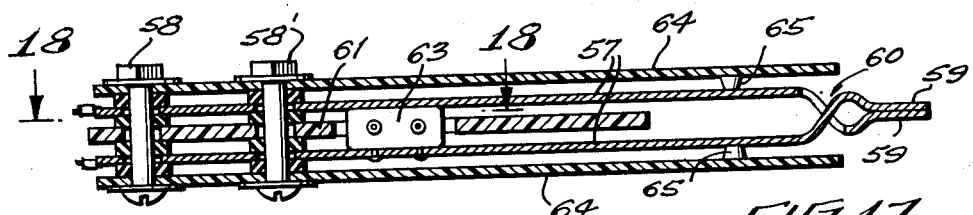
FIG.17.
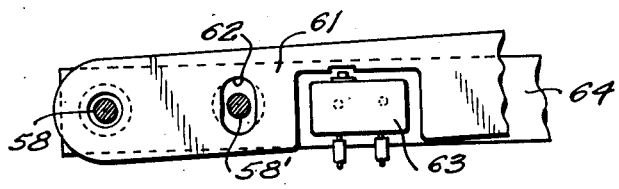
FIG.18.
INVENTOR.
NELSON O. CLARK
BY
ATTORNEY Patented Apr. 27, 1954

2,677,039

UNITED STATES PATENT OFFICE 2,677,039

SOLDERING DEVICE AND ITS OPERATING SYSTEM

Nelson O. Clark, Winthrop, Mass.

Application May 15, 1952, Serial No. 287,865

7 Claims. (Cl. 219—26)

This invention relates generally to soldering devices, including an electric system for operating them, and more particularly to soldering instrumentalities, the soldering points of which are normally heated to a sufficient degree to render soldering fluxes applied to them in a fluid state to prevent them from oxidizing and thus keeping them always ready for effective soldering operations.

The principal objects of this invention are the provision of an electric system for soldering devices by the use of which system a soldering instrumentality is normally supplied with a low current for heating its soldering tips to a degree sufficient to render soldering flux fluid to cover their surface, thus preventing them from oxidizing, and in which system control means are provided to regulate the supply of current for effectuating soldering operations.

Another object of this invetnion is the provision of a soldering device in the form of workholding tweezers having electrically conductive, compressible blades terminating in soldering tips normally in contact with one another so as to permit flow of current through the tweezer blades for the purpose of keeping the tweezer tips at a sufficient temperature to render flux applied to them in fluid condition.

Another object of this invention is the provision of soldering tweezers with normally closed soldering tips and which tweezers comprise a pair of resilient compressible blades which are rigidly joined but electrically separated from one another at one of their ends and which blades, when compressed, will cause the soldering tips thereof to separate.

A still further object is the provision of a soldering device in the form of a tweezer structure composed of two resilient compressible blades which are rigidly joined but electrically separated from one another at one of their ends, while their other ends terminate in soldering tips which are normally maintained in contact engagement with one another, and wherein the blades cross each other intermediate between their ends without touching at their crossing area, and wherein the normally contacting soldering tips are separable when the blades are compressed at points between their joined ends and their crossing area.

Another important object of this invention is the provision of tweezers as stated above, wherein are provided heat insulating dielectric blade-covering gripping means which are sufficiently spaced from the blades to provide air circulation about the blades for the purpose of cooling them and which gripping means, when compressed, are intended to facilitate the movement of the blades relative to one another for the purpose of opening their normally closed tip ends to facilitate gripping a work piece to be soldered.

Still another object of this invention is the provision of a soldering device of the type indicated, wherein the tweezer blades are made of material which is highly conductive electrically, and wherein the tips provided for the tweezer ends are made of another material having high contact resistance characteristics.

A still further object is the provision of a soldering device in the form of tweezers, wherein the blades are made of composite layers of different materials, one of the layers having high electric conductivity while the other layer possesses a relatively low electric conductivity, and wherein the soldering tips are made of still another material but which is integrated with the material of the blades and possesses the characteristics of normally shedding solder, thus preventing the latter from adhering to the tips.

A still further object is the provision of soldering tweezers wherein the blades are made of a material being electrically conductive but having a low heat conductivity, and wherein the soldering tips are made of a different material but are integrated with the ends of the blades and having the characteristics of high contact resistance.

Still another object of this invention is the provision of a soldering device in the form of a tweezer structure having a pair of cooperating resilient electrically conductive blades which are fixedly joined but electrically separated at one of their ends, while their other ends are normally in contact with one another, and wherein the blades are rendered compressible by means of outer dielectric insulating tweezer-gripping members which are associated with the blades but are spaced from them, and wherein the tweezer structure is provided with a switch unit which is adapted to be actuated during soldering operations.

A more specific object of this invention is to provide in combination with a tweezer structure, a switch unit in the form of a mercury switch tube for effecting the passage of heating current through the tweezers when the latter are held in working position.

Another specific object of this invention is the provision of a soldering device in the form of a tweezer structure as stated above, provided with a switch unit in the form of a micro-switch which is disposed between the blades, and wherein a switch-operating lever is employed which, when compressed, will close the switch while the tweezers are being held in operative position.

Still another object of this invention is to provide a soldering device of the tweezer structure type wherein the soldering tips of the tweezers are provided with a material which has high contact resistance and which tweezer tips are intended to be permanently closed for the use as a miniature soldering device for pin-point soldering of very small articles.

The foregoing and numerous other important objects and additional advantages of the present invention will becomes more fully understood from the ensuing description in conjunction with the accompanying drawings which, although illustrating specific structures, are intended to serve for explanatory purposes only and are not designed to restrict the present disclosure to the actual showing, and wherein:

Fig. 1 denotes a diagram of an electric system employing a soldering instrument in the form of a tweezer structure, the tips of which are permanently heated by a relatively low current supply and are adapted to be heated to a higher degree for soldering operations;

Fig. 2 illustrates another form of an electric system modified from that shown in Fig. 1;

Fig. 3 is still another modification of a similar electric system with a different form of current control;

Fig. 3a is a section taken along lines 3a—3a of Fig. 3;

Fig. 4 is a diagram of an electric system similar to that shown in Fig. 3 with the employment of soldering tweezers equipped with a switch unit controlling the supply of current for soldering operations;

Fig. 12 is a plan view of a modified form of a tweezer structure employing a switch unit in the form of a mercury switch;

Fig. 13 is a section taken along lines 13—13 of Fig. 12;

Fig. 14 is a detail plan view of the soldering tips of the tweezers shown in Fig. 12 wherein is indicated the crossing area of the tweezers;

Fig. 15 is a detail end view of the tweezer tips holding a work piece;

Fig. 17 is a section taken along lines 17—17 of Fig. 16 but showing the complete structure; and Fig. 18 is a fragmental section taken along lines 18—18 of Fig. 17.

The electric system

Figure 5:
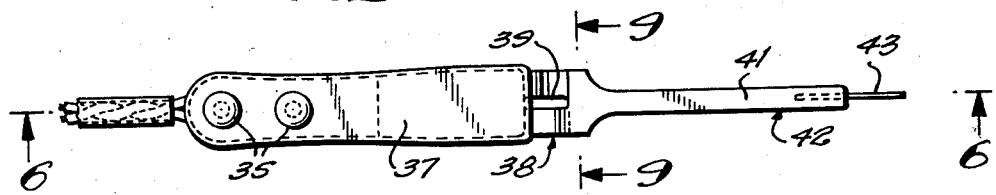
Fig. 5 is a plan view of a tweezer structure having blades composed of two layers of different electric and heat conductivity.
Figure 6:
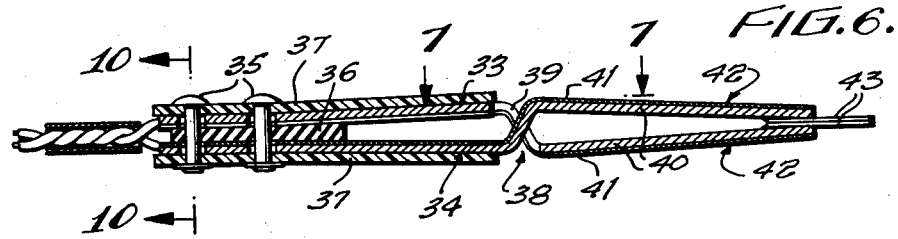
Fig. 6 is a section taken along lines 6—6 of Fig. 5.
Figure 8:
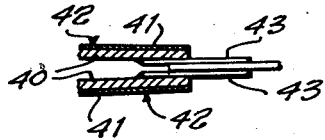
Fig. 8 is a section through the tip-equipped ends of the tweezers shown in Fig. 5 holding a work piece.
Figure 7:
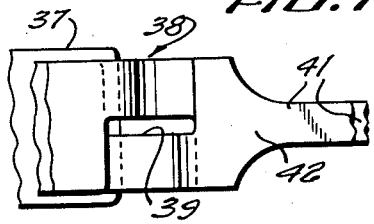
Fig. 7 is a fragmental enlarged plan view of the crossing area in the tweezer structure shown in Fig. 5.
Figure 9:
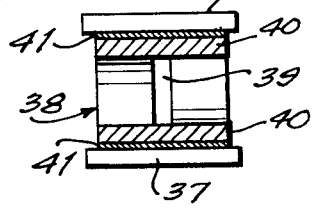
Fig. 9 is an enlarged section taken approximately along lines 9—9 of Fig. 5.
Figure 11:
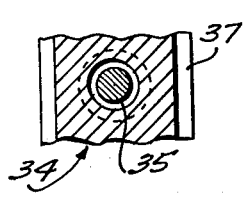
Fig. 11 is a section taken along lines 11—11 of Fig. 10.
Figure 10:
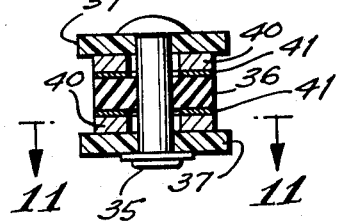
Fig. 10 is an enlarged section taken along lines 10—10 of Fig. 6.

In describing Figs. 1 to 4, it will be noted that in each of these illustrations there is employed a transformer 10, from one terminal of primary 10' of which extends a lead 11 to one potential 12 of a source of energy, the other potential 13 of that source being connected in different manners in each of the four illustrations to the other terminal of the transformer primary, but in each case the current supply from that potential is controlled by a single pole, double throw, two-contact switch 14, the switch lever of which normally engages one of the contacts 15, but is adapted to be switched into engagement with normally free switch contact 16 whenever a supply of current is required for soldering operations.

In Fig. 1 a lead 17 extends from source potential 13 to a resistance 18 and from that resistance a lead 19 passes over contact point 20 to the other, upper terminal of transformer primary 10'. The primary is seen to be tapped at four points for the purpose of regulating the intensity of the current supply by means of a switch lever 21 connected by lead 22 to normally free contact 16 of switch 14. Resistance 18 may be substituted by a choke 18' indicated above that resistance.

While switch 14 is in its normal position shown, resistance 18 or choke 18' permits but a limited current supply to pass into primary 10' of the transformer, whereby a correspondingly limited current output from the transformer secondary 23 reaches the terminals of tweezer structure 24 and its normally contacting soldering tips 25. However, that limited current supply to the tweezer structure is sufficient to keep its tips constantly heated at a temperature at which the soldering flux applied to the tips will liquify and will be kept in fluid state so that it will cover the tips, prevent their oxidation, and render them ready always for effective soldering operations.

For the purpose of effecting such soldering operation, the tweezers are momentarily separated by compressing the tweezer blades so that the tips may grip the work piece to be soldered, while at the same time switch 14 is caused to disengage contact 15 and to engage contact 16. This is preferably done by a foot pedal arrangement or other suitable means so that both hands of the operator are free for use during soldering operations. Depending upon the intensity of current required, tap lever 21 is moved to the desired primary tap point.

In Fig. 2 the primary of transformer 10 is shown without taps, and resistance 18, seen in Fig. 1, is replaced by choke coil 18', but in every other respect diagrams 1 and 2 are quite similar.

In the diagram shown in Fig. 3, a tapped choke 26 is introduced in the connection between contact 15 and the upper terminal of transformer primary 10' and tap lever 27 is connected with normally open contact 16 of switch 14. By adjusting tap lever 27 to any one of the taps of the choke the current supply to tweezer tips 25' may be readily governed. The type of tweezer 24' shown in Fig. 3 is intended to have its tips normally in contact with one another, and in that embodiment, the tweezers serve as a miniature or pin-point soldering iron, the heating of which is regulated by tapped choke 26. It will be observed also that the tweezer tips are equipped with metal elements 28 which possess the characteristics of having high contact resistance. In other words these resistance elements are intended to become heated to a far greater degree than the tip ends or any other part of the tweezer blades. In order to hold these resistance elements in close adjacency with one another, tweezer blades 28' are resilient and are biased toward each other and have clip-like, compressible extensions 28'' encased in dielectric and heat-insulating material and which are normally spaced from the blades bodies. By exerting slight pressure upon these extensions, the tips of the blades are separated and can be used for gripping articles to be soldered.

For the purpose of normally keeping the tip ends sufficiently warm to liquefy the soldering flux, the supply of current passes through the entire length of the choke coil while switch 14 engages contact 15. During actual soldering operation, however, switch 14 is moved to contact 16, and the intensity of the current for heating tip elements 28 to the desired degree is regulated by the setting of tap lever 27. The maximum current supply to the transformer primary is effected by placing tap lever 27 in contact with the left-hand end tap of choke 26.

In the diagram illustrated in Fig. 4, which is very similar to that shown in Fig. 3, there is again employed a tapped choke 29 and a tap lever 30 for regulating the current supply to the transformer primary, however in this system contact 16 of switch 14 is connected with tap lever 30 through a switch unit 31 which forms a permanent part of tweezer structure 32. By placing tap lever 30 in contact with the different taps of choke 29 the current for heating the tips of the tweezer structure is controlled in the same way as explained in connection with Fig. 3. For actual soldering operation, however, when switch 14 engages contact 16, current to the tweezers is delivered only when the tweezers are held in operating or soldering position. At that position of the tweezers the switch unit closes the circuit to energize the primary and to supply heating current through the secondary to the tweezer points. Switch unit 31 may be either of the mercury tube structure or of a manually operated micro-switch type, as will be presently explained.

*Soldering devices*

In Figs. 5 to 10 is shown a specific tweezer structure wherein the blades are made of composite layers of material. In describing this tweezer structure in detail, numerals 33 and 34 denote the two tweezer blades which are permanently associated with one another at one of their ends by rivets, screws or other suitable means indicated at 35, but which are electrically insulated from one another by suitable dielectric material 36. At the outer surfaces of the blades are provided dielectric and heat-insulating gripping elements 37, assuring safe handling of the tweezers. This tweezer structure is of the type where the two tweezer blades cross each other as at 38 without touching one another at their crossing area by providing a suitable spacing 39 between the blades, see Figs. 5 and 7. As will be observed especially from Fig. 6, the blades are composed of two layers of material having different characteristics, one of the layers having a lesser heat conductivity than the other, while the other layer has a higher electric conductivity. These layers are respectively indicated at 40 and 41, layers 40 being made, for instance, of low heat conductivity stainless steel, whereas layers 41 are made of copper or silver of high electric and heat conductivity. It will be noted that the copper or silver layers 41 are placed along the interior surfaces of layers 40 where the blades are joined with one another, while they cover the outer surfaces of layers 40 from the crossing area of the tweezers towards their tips. It will be also noted that to the narrow blade ends 42 are secured by welding or otherwise soldering tips 43, preferably made of tungsten or any other suitable material which will resist solder from depositing and thus preventing it from readily adhering to the tips. These tips through their secure attachment to the blades become integral parts of the blade material.

Figure 16:
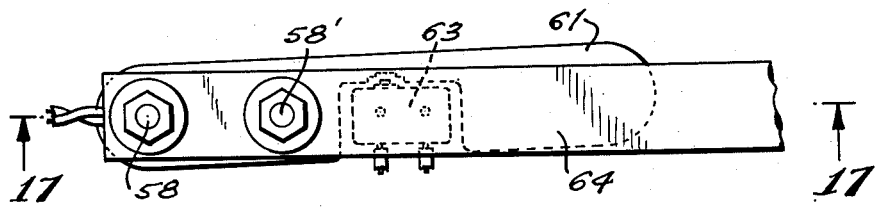
Fig. 16 is a plan view disclosing a portion of a modified tweezer structure equipped with a switch unit in the form of a micro-switch.

Tweezer structures provided with switch units operable while the tweezers are being used are illustrated in Figs. 12 to 18. In Figs. 12 to 14 there is shown a tweezer structure equipped with a mercury switch, while the form shown in Figs. 16 to 18 is provided with a hand-operated micro-switch.

In the embodiment of Figs. 12 to 14 it will be noted that the tweezer blades 44 are provided with outwardly bent portions 45 and that their crossing area 46 is located near the very narrow blade tips 47. The left end of blades 44 are fixedly held together by means of rivets, screws or any other means 48, but are insulated from one another by dielectric spacers 49. Similar spacers 50 are employed for separating these blades from dielectric heat insulating elements 52 which are adapted to engage the bowed-out portions 45 of the blades but which are otherwise spaced from the blade bodies so as to provide air circulation all around the blades. Also held by rivets 48 is a frame 53 in which is mounted a mercury switch 54 which controls the supply of current to the terminals of the blades.

The crossing area of the blades is clearly shown in Fig. 14 where a spacing 55 between the blades is clearly indicated. In Fig. 15 the narrow tips 47 are shown separated and holding a work piece 56. Tips 47 are brought to their work piece holding position when the blades are compressed as insulating elements 52 are forced toward one another.

The tweezer construction shown in Figs. 16, 17 and 18 is very similar to that described in connection with Figs. 12 to 15. Here again two blades 57 are shown which are spaced and insulated from one another and are held together by screws 58 and 58' at one end, while their other end terminates in normally contacting soldering tips 59 which cross each other at 60 without touching at their crossing area. The spacing between blades 57 at their connected ends is much greater than the blade spacing shown in Fig. 13, and in that wider space there operates a dielectric lever 61 which is pivoted about screw 58 but can swing in relation to screw 58' by reason of an oval aperture 62 provided in the lever body, as clearly seen in Fig. 18.

Secured between the blades is a micro-switch 63, the operation of which is effected by the movement of lever 61, and which switch controls the supply of current to blades 57. It will be noted from Fig. 17 that exterior to the blades are arranged dielectric insulating elements 64 provided with extensions 65 in engagement with blades 57. These dielectric elements facilitate the gripping of the tweezer structure and prevent the hand holding the tweezers from being injured by either the current passing through or the heat emanating from the tweezer blades.

By the compression of these insulating elements tweezer tips 59 may be separated for receiving a work piece to be soldered. While the tweezers are being held, lever 61 is operated to close the micro-switch, thereby supplying heating current to the tweezers.

While in the foregoing specific forms of soldering devices and systems for operating them were described, it is quite obvious that, depending upon the work to be performed, in both the system and the tweezer structures changes and modifications may become necessary. Inasmuch as it would be impractical to illustrate and describe all possible modified forms of arrangements, and since such modifications are self understood, they are not supplied but are deemed to form part and parcel of the instant invention, as defined in the annexed claims.

What is claimed as new is:

1. In an electric system for soldering devices, soldering tweezers having manually separable but normally contacting, heatable, work-engaging terminals, a power source, a transformer, the secondary of the latter being connected with the tweezer terminals, one terminal of the transformer primary being directly connected with one potential of the power source, a single pole, double throw, two-contact switch connected with the other power source potential and normally engaging one of its contacts, a tapped impedance connected at one of its terminals with that one switch contact, the other impedance terminal being connected with a lever serving the taps of the impedance, a switch unit forming a part of the tweezers, one terminal of the switch unit being connected with said switch unit lever, and the other switch unit terminal being connected with the other contact of the two-contact switch.

2. In an electric system as in claim 1, said soldering tweezer terminals comprising a pair of resilient, compressible blades rigidly joined with but electrically separated from one another at one end, and normally contacting each other at their other end, but being separable at that other end when compressed at points remote from their joined end, and high contact resistance elements provided at said normally contacting other ends.

3. In an electric system according to claim 2, and wherein said tweezer blades are made of material having high electric conductivity, their contacting ends terminating in tips integral with the blades but having high contact resistance characteristics.

4. In an electric system according to claim 2, and wherein said tweezer blades are made of composite layers of materials, one material having higher electric conductivity than the other, the blade ends which are normally in contact engagement terminating in tips integral with the blade materials and being made of material to which solder will not readily adhere.

5. In an electric system according to claim 2, and wherein a switch unit forms a part of the tweezers and being operative while the latter is being used for soldering operations.

6. In an electric system according to claim 5, and wherein said switch unit comprises a mercury switch.

7. In an electric system according to claim 5, and wherein said switch unit comprising a microswitch, said tweezers having means for actuating said microswitch.

References Cited in the file of this patent

UNITED STATES PATENTS

| Number | Name | Date |
|---|---|---|
| 450,266 | Truax | Apr. 14, 1891 |
| 485,017 | Ries | Oct. 25, 1892 |
| 1,435,470 | Hosford | Nov. 14, 1922 |
| 1,659,911 | Fay | Feb. 21, 1928 |
| 1,807,004 | Nelson | May 26, 1931 |
| 2,106,436 | Schubert | Jan. 25, 1938 |
| 2,449,521 | Warner | Sept. 14, 1948 |
| 2,577,515 | Durst | Dec. 4, 1951 |
| 2,595,683 | Lo Monte | May 6, 1952 |
| 2,619,576 | Greibach | Nov. 25, 1952 |
| 2,623,152 | Ammon | Dec. 23, 1952 |

FOREIGN PATENTS

| Number | Country | Date |
|---|---|---|
| 208,590 | Switzerland | May 1, 1940 |
| 380,026 | Great Britain | Sept. 8, 1932 |